United States Patent
Antonini et al.

(10) Patent No.: US 7,475,882 B2
(45) Date of Patent: Jan. 13, 2009

(54) SILICONE FOAM RUBBER SEALING BEAD ON COMPOSITE GASKET AND METHOD OF MANUFACTURING

(75) Inventors: Joseph Antonini, Chicago, IL (US); Thomas E. Staab, Chicago, IL (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 636 days.

(21) Appl. No.: 10/397,111

(22) Filed: Mar. 26, 2003

(65) Prior Publication Data

US 2003/0230857 A1   Dec. 18, 2003

Related U.S. Application Data

(60) Provisional application No. 60/388,686, filed on Jun. 14, 2002.

(51) Int. Cl.
   *F02F 11/00*   (2006.01)
(52) U.S. Cl. .................. 277/596; 277/592; 277/593
(58) Field of Classification Search .............. 277/592, 277/596, 594, 593
   See application file for complete search history.

(56) References Cited

U.S. PATENT DOCUMENTS

| | | | |
|---|---|---|---|
| 1,927,450 A | | 9/1933 | Balfe |
| 2,055,471 A | | 9/1936 | Balfe |
| 3,737,169 A | * | 6/1973 | Glynn .................... 277/596 |
| 3,864,181 A | * | 2/1975 | Wolinski et al. .............. 156/79 |
| 3,930,656 A | | 1/1976 | Jelinek |
| 3,950,576 A | * | 4/1976 | Desverchere ................ 427/284 |
| 4,181,313 A | * | 1/1980 | Hillier et al. ................. 277/638 |
| 4,307,127 A | * | 12/1981 | Shah .......................... 427/461 |
| 4,477,094 A | * | 10/1984 | Yamamoto et al. ........... 277/592 |
| 4,659,410 A | * | 4/1987 | McDowell et al. ........... 156/277 |
| 4,723,783 A | * | 2/1988 | Belter et al. ................. 277/592 |
| 4,776,602 A | * | 10/1988 | Gallo .......................... 277/592 |
| 4,993,723 A | * | 2/1991 | Sroka et al. ................. 277/596 |
| 5,391,212 A | | 2/1995 | Ernst et al. |
| 5,510,152 A | | 4/1996 | Boldt |
| 5,536,758 A | | 7/1996 | Boldt |
| 5,540,452 A | | 7/1996 | Belter |
| 5,631,049 A | | 5/1997 | Boldt |
| 5,667,227 A | | 9/1997 | Boldt |
| 6,039,779 A | | 3/2000 | Butz et al. |
| 6,113,109 A | * | 9/2000 | Lieb et al. .................... 277/590 |
| 6,159,261 A | | 12/2000 | Binder et al. |
| 6,186,506 B1 | * | 2/2001 | Kionoshita .................. 277/313 |
| 6,478,306 B1 | * | 11/2002 | Kobayashi et al. ........... 277/592 |

* cited by examiner

*Primary Examiner*—Alison K Pickard
(74) *Attorney, Agent, or Firm*—Marshall & Melhorn, LLC

(57) ABSTRACT

An air intake manifold gasket has a perforated core of metal including protrusions or tangs extending from a first planar surface and a second planar surface of the core. Joined to each planar surface of the core is an expanded graphite sheet to form a gasket body having planar surfaces. Screen printed to form a bead on peripheral edges of the planar surfaces of the gasket body is a silicone foam rubber material adapted to replace traditional silicone rubber structures used for the same purpose. The silicone foam rubber material includes a foaming agent that causes the material to expand during an oven-curing period. The amount of expansion of the silicone rubber coating is up to three times the thickness of the coating originally applied. As disclosed, the oven cure is for approximately 10 minutes at about 300 degrees Fahrenheit.

14 Claims, 2 Drawing Sheets

SILICONE FOAM RUBBER SEALING BEAD ON COMPOSITE GASKET AND METHOD OF MANUFACTURING

PRIORITY CLAIM

The present application claims priority to Provisional U.S. Patent Application Serial No. 60/388,686, filed Jun. 14, 2002 and entitled "Silicone Foam Rubber Sealing Bead on Composite Gasket and Method of Manufacture." Applicants incorporate the application herein by reference and claim priority of the earlier filed application pursuant to 35 U.S.C. §119(e).

TECHNICAL FIELD

This invention relates generally to improvements in designs of gaskets for certain automotive applications. More particularly, the invention relates to improvements in the manufacture of gaskets for air intake manifolds having a sealing bead of silicone rubber.

BACKGROUND OF THE INVENTION

Planar-style gaskets employed in the automotive arena including air intake manifolds have traditionally been formed of composite gasket body materials having beads. The beads are generally positioned along a peripheral edge of the gasket body. When the gasket is compressed between two joining surfaces such as an engine head and engine block, the beads also compress and form a seal between the joining surfaces. The seal prevents the transmission of fluid or gases and with the example of the air intake manifold gasket, the seal prevents the transfer of an air/fuel mixture. A traditional material used to form the sealing beads is silicone rubber. Silicone rubber has achieved a perception in the automotive industry of superior sealing results and is relatively inexpensive when compared to other alternative materials.

In the past, manufacture of gaskets with silicone rubber beads have been time consuming and expensive. Often, spacing between two mating surfaces is greater than the thickness of the gasket body and accordingly, the height of the sealing bead must match this distance in order to provide an effective seal. The most common technique for applying the silicone rubber bead to the planar surfaces of the gasket body is by screen printing. One pass of the screen typically deposits 0.007" to 0.008" of material on the body. In order to fill the distance between the mating surfaces, approximately three passes must be made. Each subsequent pass deposits a slightly narrower bead of the rubber and requires a different size screen. The repetitive passes of the screen printing process and the constant change of screen sizes becomes expensive and time consuming.

A further disadvantage of traditional gaskets having sealing beads is seal failure resulting from the rigorous pressure and high temperature demands of modern engines. Once the bead is compressed under these conditions in may burst or tear. The seal will fail, thereby leaking fluids and gases.

A gasket with improved sealing capability and more convenient manufacture is needed particularly with air intake manifold applications; one employing improved sealing materials, and one involving less time consuming and less expensive manufacturing processes.

SUMMARY OF THE INVENTION

The present invention offers an improved gasket for automotive applications including air intake manifold gaskets. The gasket includes a central core having two substantially planar surfaces. One of the planar surfaces of the core is joined to at least one sheet to form a composite gasket body with at least one surface. Beads are applied to peripheral edges of the gasket, and the beading material employed includes a foaming agent that causes the material to expand during a subsequent curing period.

The present invention also discloses an improved method of manufacture of the gaskets. First the core, having first and second planar surfaces is joined with sheets on both surfaces to form a gasket body. Next, the bead material which has a foaming agent is screen printed to a peripheral edge of a first side of the gasket body. Once the bead material is applied to the body, the gasket is cured at a first predetermined temperature for a first predetermined time to cure the bead material onto the gasket body. Next the bead material is applied to the peripheral edge of a second side of the gasket body and the material is cured for a second predetermined time at a second predetermined temperature to form the sealing bead.

DETAILED DESCRIPTION OF THE EMBODIMENTS

Figure 1:
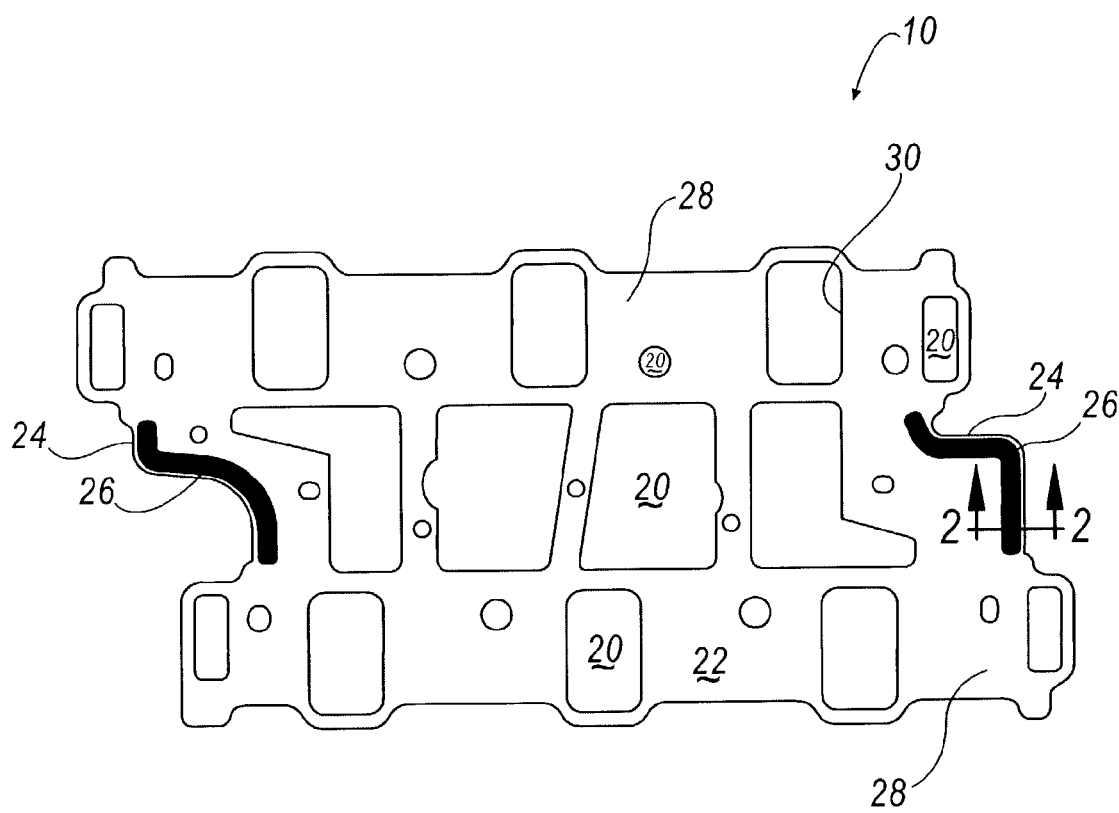
FIG. 1 is a top view of a gasket having silicone rubber beads for use with an air intake manifold in accordance with the present invention.
Figure 2:
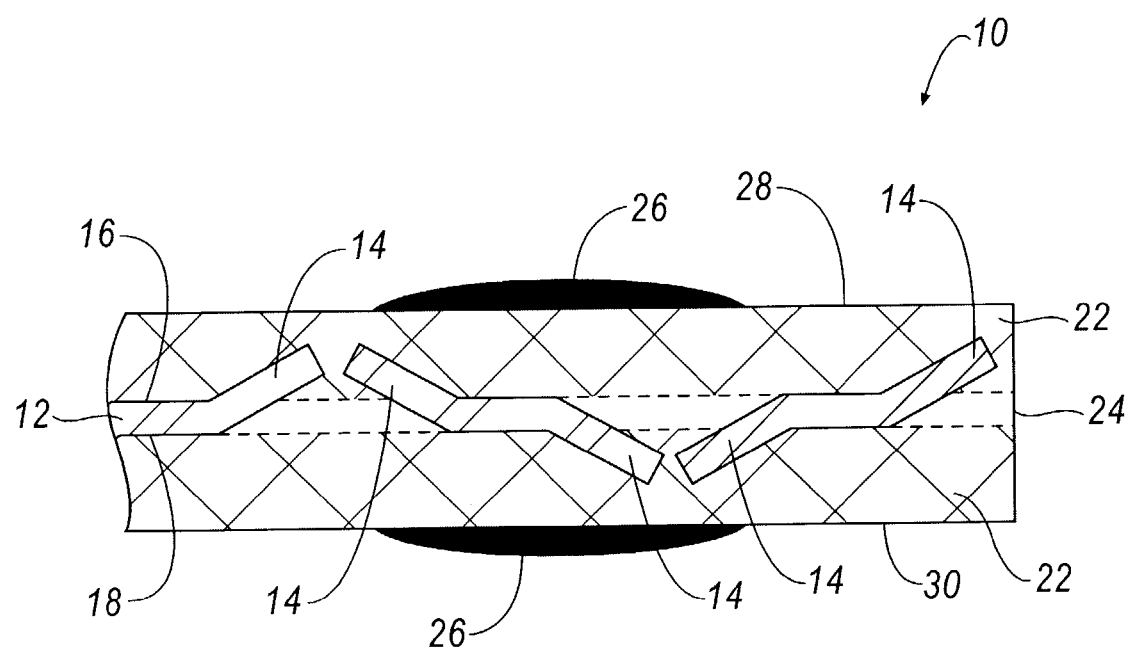
FIG. 2 is a cross-sectional view along lines 2-2 in FIG. 1 of the gasket having a composite gasket body and silicone foam rubber beads for use with an air intake manifold.

Referring to FIGS. 1 and 2, a gasket for an air intake manifold is generally shown at 10. Gasket 10 includes a core 12. Core 12 is preferably made from a steel material and includes a plurality of regularly spaced tangs or protrusions 14 that extend orthogonally in both directions from a first planar surface 16 and a second planar surface 18 of core 12. As shown in FIG. 2, the tangs 14 may be relatively thin extensions with angled ends. However, the tangs or protrusions 14 may be any shape. Protrusions or tangs 14 are typically formed in core 12 by a die in a punching press although alternative techniques are also contemplated. Gasket 10 also includes a plurality of apertures 20 to accommodate engine passages. The passages transmit fluids and gases and specifically the air intake manifold passages transmit a fuel and air mixture to a combustion chamber (not shown) of an automotive engine.

Joined to first planar surface 16 and second planar surface 18 of core 12 are sheets 22 of expanded graphite that is rolled to a continuous foil. Sheets 22 of expanded graphite are comprised of expanded graphite powder. Graphite powder is mined and treated with an acid such as hydrochloric acid or sulfuric acid. The graphite powder is then heated in a furnace and expands to at least 200 times its original size to form expanded graphite powder. The expanded graphite powder is repeatedly processed through a calender to reduce the thickness of the powder and increase its density to eventually produce expanded graphite sheets 22. Graphite sheets 22 provide excellent sealability, conformability, and conductivity. Expanded graphite sheets 22 are joined to first and second planar surfaces (16 and 18) of core 12 through a calender process. Other techniques for joining sheets 22 to core 12 will be appreciated by those skilled in the art.

Gasket 10 is positioned between two mating surfaces to form a seal. To improve sealability and prevent the transmission of fluid and gases, a bead material is deposited on peripheral edges 24 of first side 28 and second side 30 of gasket 10 to form beads 26. Preferably, the bead material is a silicone foam rubber that has a consistency of a liquid paste. The silicone foam rubber includes a variety of components including a foaming agent. The foaming agent, when heated, expands the bead material to about one and one-half to about three times its original height.

The bead material is preferably applied to the gasket using a screen printing process that is well known to one skilled in the art. Depending on the viscosity of the components, the screen mesh size may range from about 120 mesh to about forty mesh, though in many cases the mesh size may range from about sixty mesh to about forty mesh. Only one pass of the screen is necessary to deposit the requisite amount of bead material onto peripheral edges 24 of gasket 10 thereby forming a first thickness. Once the foaming agent is heat activated, the bead material will expand to a second thickness. The second thickness is predetermined to provide an effective seal between the two mating engine surfaces.

Precursors or components of the beading material include one or more cross-linkable polymers, a curing agent, and a blowing agent that generates gas when activated (e.g., heated). The bead material may also include particulate fillers, antioxidants, plasticizers, curing co-agents, activators and catalysts, cure inhibitors, and the like. A cross-linkable polymer may be one of several common elastomeric materials used in viscoelastic adhesives, as will be appreciated by those skilled in the art. Particularly useful cross-linkable polymers include acrylonitrile butadiene rubber, and mixtures of acrylonitrile butadiene rubber and epoxy resin, which may be cross-linked using conventional curing agents. Any blowing agent may be used as long as it is compatible with the cross-linkable polymer. Suitable blowing agents include microspheres that expand upon heating and are available under the trade name EXPANCEL from EXPANCEL Inc. Other useful blowing agents include activated azodicarbonamide materials, which are available under the trade name CELOGEN from UNIROYAL CHEMICAL.

Such a beading material may be obtained from WACKER SILICONES of Adrian, Mich. under the designation ER93018. The silicone foam rubber includes a major portion of polydimethylsiloxane, a minor portion (about one wt. % to about five wt. %) of trimethoxy[3-(oxiranylmethoxy)propyl]-silane, an organoplatinum curing catalyst, a cure inhibitor, and expandable microspheres (blowing agent). The silicone foam rubber is preferably screen printed in one pass onto gasket 10 to a first thickness of about 0.007" to about 0.010". This may be accomplished through use of a THIEME Model No. 1020 screen printer and a 60-mesh screen. The beads 26 are cured in a convection oven for preferably ten minutes at about 149° C. or approximately 300 degrees Fahrenheit. After curing, the resulting silicone foam rubber beads 26 have a second thickness of about 0.015" to about 0.030".

To manufacture gasket 10, perforated core 12 is joined with expanded graphite sheets 22. Then, the first thickness of the beading material, silicone foam rubber, is screen printed to the peripheral edges 24 of first side 28 of gasket 10. Gasket 10 is next cured in a convection oven. The preferable parameters include heating gasket 10 at approximately 300 degrees Fahrenheit for approximately ten minutes. The manufacturer of the beading material does not recommend heating the silicon foam rubber at a higher temperature because the foaming agent that triggers expansion may melt and then the beading material would not expand to the second thickness. Alternative parameters, however, are available. For example, gasket 10 may be cured at 212 degrees Fahrenheit for approximately four hours or at 266 degrees Fahrenheit for approximately thirty minutes.

Once sealing bead 26 is formed on first side 28, gasket 10 is rotated and the beading material is screen printed to peripheral edges 24 of second side 30. Again, gasket 10 is cured in the convection oven for approximately 10 minutes at approximately 300 degrees Fahrenheit.

Those skilled in the art will appreciate that tangs or protrusions 14 act to prevent gasket 10 from being fully compressed. Thus, tangs 14 of core 12 are designed so as to not flatten out under normal compression loads to which gasket 10 is subjected. Furthermore, resulting beads 26 will exhibit at least about fifty percent compression at low stress levels (e.g., about 100 psi). Silicone foam rubber beads 26 offer enhanced sealing effectiveness over traditional beads and much simpler manufacturing by only requiring one pass of the screen printing to eventually achieve the requisite second height.

It is to be understood that the above description is intended to be illustrative and not limiting. Many embodiments will be apparent to those skilled in the art upon reading the above description. The scope of the invention should be determined, however, not with reference to the above description, but with reference to the appended claims with the full scope of equivalents to which the claims are entitled.

What is claimed is:

1. A gasket comprising:
   a central core defining two substantially planar surfaces;
   a plurality of tangs having angled ends extending from at least one of said planar surfaces of said central core, said plurality of tangs being configured to maintain said angled ends when the gasket is under compression loads;
   at least one sheet providing sealability joined to at least one of said planar surfaces of said central core to form a composite gasket body having at least one side; and
   a bead material applied in a first thickness to on a peripheral edge of said at least one side of said composite gasket body, said bead material including a foaming agent that results in said bead material expanding substantially outwardly away from a surface of said at least one side to a second thickness greater than said first thickness during a curing period.

2. A gasket, as in claim 1, wherein said at least one sheet covers said plurality of tangs.

3. A gasket, as in claim 1, wherein said central core is a steel material.

4. A gasket, as in claim 1, wherein said bead material is a silicon foam rubber material.

5. A gasket, as in claim 1, wherein said at least one sheet of said composite gasket body is expanded graphite.

6. A gasket, as in claim 1, wherein said foaming agent is heat activated.

7. A gasket, as in claim 1, wherein said bead material is screen printed to said composite gasket body.

8. A gasket comprising:
   a central core defining two substantially planar surfaces;
   a plurality of tangs having angled ends extending orthogonally from each of said planar surfaces of said central core, said plurality of tangs being configured to maintain said angled ends when the gasket is under compression loads;
   a graphite expanded sheet with increased density and excellent sealability joined to each of said planar surfaces and covering said plurality of tangs to form a composite gasket body defining first and second sides; and a silicone foam rubber bead applied in a first thickness on peripheral edges of said first and second sides of said composite gasket body, said bead including a heat activated foaming agent that results in said bead expanding substantially outwardly away from a surface of said at least one side to a second thickness greater than said first thickness during a curing period.

9. A method of producing a gasket comprising the steps of:

providing a central core having a first planar surface, a second planar surface, and a plurality of tangs having angled ends extending orthogonally from each of said planar surfaces of said central core said plurality of tangs being configured to maintain said angled ends when the gasket is under compression loads;

joining sheets to the first planar surface and the second planar surface of the central core to form a composite gasket body;

screen printing a first thickness of material having a foaming agent to a peripheral edge of a first side of the composite gasket body;

curing the composite gasket body for a first predetermined time at a first predetermined temperature to form a bead of a second thickness generally greater than said first thickness on the first side of the composite gasket body;

screen printing the first thickness of material having the foaming agent to a peripheral edge of a second side of the composite gasket body; and curing the composite gasket body for a second predetermined time at a second predetermined temperature to form a bead of the second thickness generally greater than said first thickness ante second side of the composite gasket body.

10. A method, as in claim 9, wherein said step of curing the composite gasket body to form the bead on the first side includes a first predetermined time of approximately ten minutes and a first predetermined temperature of approximately 300° Fahrenheit.

11. A method, as in claim 9, wherein said step of curing the composite gasket body to form the bead on the second side includes a second predetermined time of approximately ten minutes and a second predetermined temperature of approximately 300° Fahrenheit.

12. A method, as in claim 9, wherein said step of providing the central core includes punching a plurality of tangs into the central core that extend orthogonally from the first and second planar surfaces.

13. A method, as in claim 12, wherein said step of joining the sheets to form the composite gasket body includes covering the plurality of tangs.

14. A gasket comprising:

a central core defining two substantially planar surfaces;

a plurality of tangs having angled ends extending from at least one of said planar surfaces of said central core, said plurality of tangs being configured to maintain said angled ends when the gasket is under compression loads;

at least one sheet providing sealability joined to at least one of said planar surfaces of said central core to form a composite gasket body having at least one side; and a bead material applied in a first thickness to on a peripheral edge of said at least one side of said composite gasket body, said bead material including a foaming agent that results in said bead material expanding substantially outwardly away from a surface of said at least one side to a second thickness greater tan said first thickness during a curing period wherein said second thickness is at least 0.020 inches.

* * * * *